(12) United States Patent
Wang

(10) Patent No.: US 12,216,564 B2
(45) Date of Patent: Feb. 4, 2025

(54) EASTER EGG PRESENTATION METHOD AND APPARATUS, ELECTRONIC DEVICE AND COMPUTER-READABLE STORAGE MEDIUM

(71) Applicant: BEIJING BYTEDANCE NETWORK TECHNOLOGY CO., LTD., Beijing (CN)

(72) Inventor: Junhao Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 73 days.

(21) Appl. No.: 17/611,433

(22) PCT Filed: Jun. 1, 2020

(86) PCT No.: PCT/CN2020/093819
§ 371 (c)(1),
(2) Date: Nov. 15, 2021

(87) PCT Pub. No.: WO2020/244487
PCT Pub. Date: Dec. 10, 2020

(65) Prior Publication Data
US 2022/0261329 A1 Aug. 18, 2022

(30) Foreign Application Priority Data
Jun. 5, 2019 (CN) .......................... 201910487554.1

(51) Int. Cl.
*G06F 16/00* (2019.01)
*G06F 11/34* (2006.01)
(Continued)

(52) U.S. Cl.
CPC ...... *G06F 11/3438* (2013.01); *G06F 16/3323* (2019.01); *G06F 16/90344* (2019.01); *G06F 16/9035* (2019.01); *G06F 16/9038* (2019.01)

(58) Field of Classification Search
CPC .................................................. G06F 16/3323
See application file for complete search history.

(56) References Cited

U.S. PATENT DOCUMENTS

2009/0265347 A1* 10/2009 Reed ...................... G06F 16/34
715/810
2013/0132088 A1 5/2013 Kim
(Continued)

FOREIGN PATENT DOCUMENTS

CN 104579934 A 4/2015
CN 107577513 A 1/2018
(Continued)

OTHER PUBLICATIONS

Chinese Patent Application No. 201910487554.1, First Office Action and Search Report mailed Dec. 21, 2020, 14 pages with English Translation.
(Continued)

*Primary Examiner* — Ajith Jacob

(57) ABSTRACT

The present disclosure discloses an easter egg presentation method, an easter egg presentation apparatus and a related device thereof. The method includes: obtaining a preference feature of a user; determining, from a plurality of candidate trigger modes preset for a target easter egg, a target trigger mode matching the preference feature; and outputting the target easter egg in response to detecting that current behavior data of the user conforms to the target trigger mode. The method can trigger the easter egg based on the preference feature of the user, achieve personalized triggering under different conditions, enhance the fun of the terminal interaction process, and enhance the interactivity between the user and the terminal, and improve the user experience.

18 Claims, 4 Drawing Sheets

(51) Int. Cl.
*G06F 16/332* (2019.01)
*G06F 16/903* (2019.01)
*G06F 16/9035* (2019.01)
*G06F 16/9038* (2019.01)

(56) References Cited

U.S. PATENT DOCUMENTS

2015/0205894 A1\* 7/2015 Faris .................. G06Q 30/0641
  703/21
2018/0349387 A1 12/2018 Zhang et al.
2019/0108578 A1\* 4/2019 Spivack ................ G09B 5/065

FOREIGN PATENT DOCUMENTS

| CN | 108449487 A | 8/2018 |
| CN | 108549567 A | 9/2018 |
| CN | 109213942 A | 1/2019 |
| CN | 110276006 A | 9/2019 |

OTHER PUBLICATIONS

Chinese Patent Application No. 201910487554.1, Second Office Action mailed Jul. 5, 2021, 12 pages with English Translation.
Chinese Patent Application No. 201910487554.1, Rejection Decision mailed Nov. 2, 2021, 6 pages with English Translation.
International Application No. PCT/CN2020/093819, International Search Report mailed Sep. 2, 2020, 6 pages with English Translation.

\* cited by examiner

EASTER EGG PRESENTATION METHOD AND APPARATUS, ELECTRONIC DEVICE AND COMPUTER-READABLE STORAGE MEDIUM

CROSS-REFERENCES TO RELATED APPLICATIONS

The present application is a U.S. National Stage Application filed under 35 U.S.C. § 371 claiming priority to International Patent Application No. PCT/CN2020/093819, filed on 1 Jun. 2020, which application is based on and claims priority to Chinese Patent Application No. 201910487554.1, filed on Jun. 5, 2019, the entire contents of which are incorporated herein by reference.

FIELD

The present disclosure relates to the field of terminal technologies, and more particularly, to an easter egg presentation method, an easter egg presentation apparatus, an electronic device, and a computer-readable storage medium.

BACKGROUND

With the rapid development of electronic technology and communication technology, smart phones have become indispensable communication terminals in daily life. By operating many applications installed on the smart phone, the user makes the smart phone perform many different functions, realizing the interaction between the user and the smart phone, and providing great convenience to people's lives. Easter eggs in the smart phones can bring users surprises and better user experience.

The related technologies support to trigger an easter egg based on a specific action. The most common action is to search for easter eggs, that is, to obtain user behaviors and trigger the corresponding easter egg in response to detecting the user's search for a specified word. However, when the easter egg is triggered in response to completion of a specified action (such as searching for a specified word), many users may never trigger a certain type of easter eggs due to different user behaviors, resulting in a single trigger mode for the easter egg, and a low coverage of the easter egg. In addition, the easter egg triggering method in related technologies is not humanized enough. If users who are not interested in an easter egg accidentally trigger the easter egg, the corresponding easter egg will also be triggered. For example, a middle-aged person wants to search for "funny" and accidentally searched for "college", triggering an educational easter egg, thus resulting in poor user experience.

SUMMARY

The purpose of the present disclosure is to solve at least one of the above technical problems.

To this end, a first purpose of the present disclosure is to provide an easter egg presentation method, which can trigger easter eggs based on a preference feature of a user, achieve personalized triggering under different conditions, improve the fun of the terminal interaction process and improve the interactivity between the user and the terminal.

A second purpose of the present disclosure is to provide an easter egg presentation apparatus.

A third purpose of the present disclosure is to provide an electronic device.

A fourth purpose of the present disclosure is to provide a computer-readable storage medium.

The easter egg presentation method provided by an embodiment of the first aspect of the present disclosure includes: obtaining a preference feature of a user; determining, from a plurality of candidate trigger modes preset for a target easter egg, a target trigger mode matching the preference feature; outputting the target easter egg in response to detecting that current behavior data of the user conforms to the target trigger mode.

According to the easter egg presentation method of the embodiment of the present disclosure, the preference feature of the user can be obtained, the target trigger mode matching the preference feature can be determined from the plurality of candidate trigger modes preset for the target easter egg, and the target easter egg is output in response to detecting that current behavior data of the user conforms to the target trigger mode. This method can trigger the easter egg based on the preference feature of the user, achieve personalized triggering under different conditions, improve coverage and accuracy, enhance the fun of the terminal interaction process, enhance the interactivity between the user and the terminal, and improve the user experience.

According to an embodiment of the present disclosure, the target trigger mode includes a target function module and a trigger condition; and said outputting the target easter egg in response to detecting that the current behavior data of the user conforms to the target trigger mode includes: outputting the target easter egg in response to detecting that an operation of the user on the target function module satisfies the trigger condition.

According to an embodiment of the present disclosure, said determining, from the plurality of candidate trigger modes preset for the target easter egg, the target trigger mode matching the preference feature includes: obtaining a set of preference features of the user corresponding to each of the plurality of candidate trigger modes; and determining the target trigger mode of the target easter egg from the plurality of candidate trigger modes preset for the target easter egg based on a matching degree between the set of preference features of the user corresponding to each of the plurality of candidate trigger modes and the preference feature.

According to an embodiment of the present disclosure, the preference feature includes trigger mode usage preference information, and said determining, from the plurality of candidate trigger modes preset for the target easter egg, the target trigger mode matching the preference feature includes: determining, from the plurality of candidate trigger modes preset for the target easter egg, a target trigger mode matching the trigger mode usage preference information.

According to an embodiment of the present disclosure, the easter egg presentation method further includes, prior to said determining, from the plurality of candidate trigger modes preset for the target easter egg, the target trigger mode matching the preference feature: obtaining an easter egg theme matching the preference feature; and obtaining the target easter egg in accordance with the easter egg theme.

According to an embodiment of the present disclosure, the easter egg presentation method further includes, prior to said outputting the easter egg in response to detecting that the current behavior data of the user conforms to the target trigger mode: providing the user with prompt information for triggering the easter egg, where the prompt information includes the target trigger mode and a recommended keyword, and the recommended keyword is determined from a plurality of candidate keywords of the easter egg based on a keyword usage preference of the user.

The easter egg presentation apparatus provided by an embodiment of the second aspect of the present disclosure includes: a first obtaining module configured to obtain a preference feature of a user; a determining module configured to determine, from a plurality of candidate trigger modes preset for a target easter egg, a target trigger mode matching the preference feature; and an output module configured to output the target easter egg in response to detecting that current behavior data of the user conforms to the target trigger mode.

According to the easter egg presentation apparatus of the embodiment of the present disclosure, the preference feature of the user can be obtained through the first obtaining module, the target trigger mode matching the preference feature is determined from a plurality of candidate trigger modes preset for a target easter egg through the determining module, and the target easter egg is output through the output module in response to detecting that current behavior data of the user conforms to the target trigger mode. The apparatus can trigger easter eggs based on the preference feature of the user, achieve personalized triggering under different conditions, improve coverage and accuracy, enhance the fun of the terminal interaction process, and enhance the interactivity between the user and the terminal, and improve the user experience.

According to an embodiment of the present disclosure, the target trigger mode includes a target function module and a trigger condition, and the output module is specifically configured to: output the target easter egg in response to detecting that an operation of the user on the target function module satisfies the trigger condition.

According to an embodiment of the present disclosure, the determining module is specifically configured to: obtain a set of preference features of the user corresponding to each of the plurality of candidate trigger modes; and determine the target trigger mode of the target easter egg from the plurality of candidate trigger modes preset for the target easter egg based on a matching degree between the set of preference features of the user corresponding to each of the plurality of candidate trigger modes and the preference feature.

According to an embodiment of the present disclosure, the preference feature includes trigger mode usage preference information, and the determining module is specifically configured to: determine, from the plurality of candidate trigger modes preset for the target easter egg, a target trigger mode matching the trigger mode usage preference information.

According to an embodiment of the present disclosure, the apparatus further includes: a second obtaining module configured to obtain an easter egg theme matching the preference feature; and a third obtaining module configured to obtain the target easter egg in accordance with the easter egg theme.

According to an embodiment of the present disclosure, the apparatus further includes: a prompt module configured to provide the user with prompt information for triggering the easter egg. The prompt information includes the target trigger mode and a recommended keyword, and the recommended keyword is determined from a plurality of candidate keywords of the easter egg based on a keyword usage preference of the user.

The electronic device provided by an embodiment of the third aspect of the present disclosure includes: at least one processor; and a memory in communication connection with the at least one processor, the memory has instructions executable by the at least one processor stored thereon, and the instructions are configured for implementing the easter egg presentation method described in the embodiment of the first aspect of the present disclosure.

The computer-readable storage medium provided by an embodiment of the fourth aspect of the present disclosure, the non-transitory computer-readable storage medium has computer instructions stored thereon, and the computer instructions are configured to cause a computer to implement the easter egg presentation method described in the embodiment of the first aspect of the present disclosure.

The additional aspects and advantages of the present disclosure will be partially given in the following description, and some will become apparent from the following description, or be understood through the practice of the present disclosure.

BRIEF DESCRIPTION OF DRAWINGS

The above and/or additional aspects and advantages of the present disclosure will become apparent and more understandable from the following description of embodiments made in conjunction with the accompanying drawings, in which.

DESCRIPTION OF EMBODIMENTS

Figure 1:
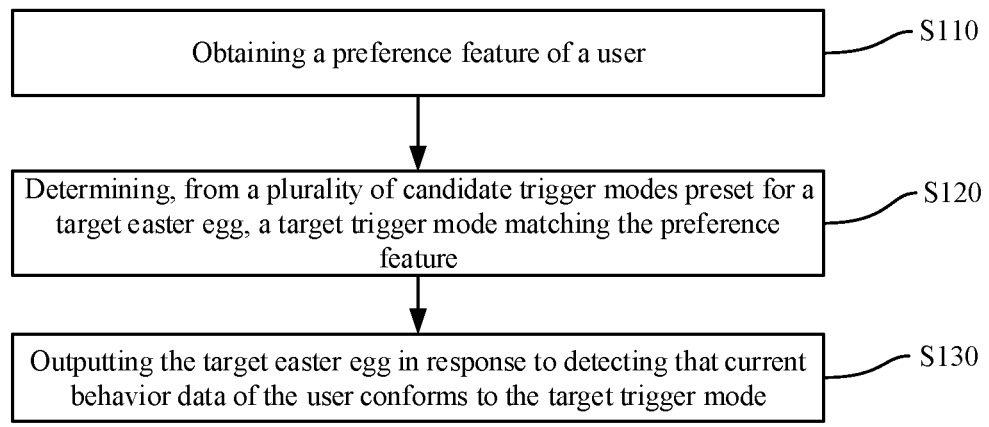
FIG. 1 is a flowchart of an easter egg presentation method according to an embodiment of the present disclosure.

The embodiments of the present disclosure will be described in detail, and examples thereof are illustrated in the accompanying drawings, throughout which same or similar elements or elements having same or similar functions are denoted by same or similar reference numerals. The embodiments described below with reference to the drawings are illustrative only, and are intended to explain rather than limit the present disclosure.

An easter egg presentation method, an easter egg presentation apparatus, an electronic device and a computer-readable medium according to embodiments of the present disclosure will be described below with reference to the drawings.

FIG. 1 is a flowchart of an easter egg presentation method according to an embodiment of the present disclosure.

In the embodiment of the present disclosure, the easter egg refers to interesting information, jokes, and functional features that are deliberately hidden in computer programs, web pages, electronic games, movies, books, and crossword puzzles.

It should be noted that the easter egg presentation method of the embodiment of the present disclosure can be applied to the easter egg presentation apparatus of the embodiment of the present disclosure, and the apparatus can be configured in the electronic device.

The electronic device may be a mobile terminal (for example, a smart phone, a tablet computer, a PAD, a personal digital assistant, and other hardware devices with various operating systems). As shown in FIG. 1, the easter egg presentation method may include operations in the following blocks.

At block S110, a preference feature of a user is obtained.

It can be understood that various applications are installed on the electronic device, and when the user uses the electronic device, corresponding historical behavior data will be generated. For example, when it is monitored that a user uses an application on an electronic device, an operating behavior of the user when using the application can be determined, and based on the operating behavior, the historical behavior data of the user corresponding to the application can be obtained, and the preference feature of the user can be obtained by analyzing the historical behavior data of the user.

It should be noted that the operation behavior includes but is not limited to browsing, purchasing, searching, etc.

For example, the easter egg presentation method of the embodiment of the present disclosure can be applied to a mobile terminal that has a variety of applications installed therein, and these applications can provide button controls corresponding to various operation behaviors. For example, a purchase link button may be provided to implement a purchase operation. For example, if a user likes "cosmetics A", the user will purchase the cosmetics through the purchase link button, so that the preference feature of the user liking cosmetics is obtained.

At block S120, a target trigger mode matching the preference feature is determined from a plurality of candidate trigger modes preset for a target easter egg.

That is to say, based on the obtained preference feature of the user, the target trigger mode with a higher matching degree with the preference feature of the user is determined from a plurality of candidate trigger modes preset for the target easter egg.

The plurality of candidate trigger modes preset for the target easter egg include but are not limited to searching, scanning, photographing, commenting, etc.

Based on the foregoing, the implementation of determining, from the plurality of candidate trigger modes preset for the target easter egg, the target trigger mode matching the preference feature is illustrated below.

In an embodiment of the present disclosure, a set of preference features of the user corresponding to each of the plurality of candidate trigger modes can be obtained, and the target trigger mode of the target easter egg is determined from the plurality of candidate trigger modes preset for the target easter egg based on a matching degree between the set of preference features of the user corresponding to each of the plurality of candidate trigger modes and the preference feature.

For example, sets of preference features of the user corresponding to three candidate trigger modes, namely, a search trigger mode, a scan trigger mode, and a comment trigger mode, can be obtained. The set of preference features of the user corresponding to the searching trigger mode includes: cosmetics, skin care products and clothing; the set of preference features of the user corresponding to the scanning trigger mode includes: camera, notebook, sound box, and smart watch; the set of preference features of the user corresponding to the comment trigger mode includes: "movie A" and "animation B", and according to matching of the obtained preference feature of the user liking cosmetics with the obtained sets of preference features of the user corresponding to the search trigger mode, the scan trigger mode, and the comment trigger mode, it can be known that the trigger mode with a higher matching degree with the preference feature of the user liking cosmetics is the search trigger mode, so that the target trigger mode of the target easter egg is determined as the search trigger mode.

In another embodiment of the present disclosure, the preference feature may include trigger mode usage preference information, and a target trigger mode matching the trigger mode usage preference information can be determined from the plurality of candidate trigger modes preset for the target easter egg.

In other words, how many times each of trigger modes used by the user has been used by the user is determined, and a target trigger mode matching the trigger mode usage preference information is determined from the plurality of candidate trigger modes.

For example, the user has used the search trigger mode 10 times, the scan trigger mode 20 times, and the comment trigger mode 15 times. It can be known that the trigger mode preferred by the user is the scan trigger mode, and from the plurality of candidate trigger modes, namely, the search trigger mode, the scan trigger mode and the shooting trigger mode, the target trigger mode that matches the trigger mode preferred by the user is determined as the scan trigger mode.

At block S130, the target easter egg is output in response to detecting that current behavior data of the user conforms to the target trigger mode.

In an embodiment of the present disclosure, the target trigger mode includes a target function module and a trigger condition. In other words, the target easter egg is output in response to detecting that an operation of the user on the target function module satisfies the trigger condition.

The target function module includes but is not limited to function modules such as search, scan, comment, and photographing, etc.

The trigger condition refers to a condition set for triggering the target easter egg when the corresponding target function module is used.

It needs to be understood that for the same target easter egg, the corresponding trigger condition varies as the target function module varies.

For example, assuming that the target easter egg is an easter egg corresponding to April Fools' Day, and the target function module is a search function module, then the trigger condition can be set as the input of keyword "April Fools' Day". According to the preference feature of the user, the trigger mode for the user to trigger the target easter egg is determined as the search trigger mode; and when it is detected that the search keyword input by the user in the search input box is "April Fools' Day", the target easter egg is output on a search user interface.

For another example, assuming that the target easter egg is an easter egg corresponding to April Fools' Day, and the target function module is a comment module, then the trigger condition can be set as the user inputting "April Fools' Day" in the comment section. According to the preference feature of the user, the trigger mode for the user to trigger the target easter egg is determined as the comment trigger mode, and when it is detected that the comment words input by the user in the comment section is "April Fools' Day", the target easter egg is output on a comment user interface.

In an embodiment of the present disclosure, outputting the target easter egg includes: displaying at least one picture; or displaying a target text or target expression; or playing a target video or target music; or displaying a floating window on a current display interface of the terminal; and displaying the target easter egg in the floating window or displaying the target easter egg in the floating window by animation.

Said displaying the target easter egg in the floating window by animation includes: displaying at least one picture included in the target easter egg in the floating window by animation; or obtaining animation effects corresponding to each picture included in the target easter egg according to a correspondence relation between each picture included in the target easter egg and the animation effects; and displaying each picture included in the target easter egg in the floating window in accordance with the animation effects corresponding to each picture included in the target easter egg.

In an embodiment of the present disclosure, when the extracted user preference feature cannot be mapped to an easter egg label, the easter egg will not be triggered even if the trigger condition is satisfied at this time. For example, when the extracted preference feature of the user is liking commenting on "funny", and the user behavior is detected as searching for "funny" at this time, that the preference feature of the user cannot be mapped to the easter egg label can be determined, and the easter egg with the theme of "funny" may not be triggered at this time. As a result, the inconvenience to the user that a one-size-fits-all trigger mode is adopted when the user is not interested in an easter egg but accidentally triggers the easter egg is avoided, and the easter egg will not be triggered and will be avoided for users who have no intention of history.

According to the easter egg presentation method of the embodiment of the present disclosure, the preference feature of the user can be obtained, the target trigger mode matching the preference feature is determined from a plurality of candidate trigger modes preset for the target easter egg, and the target easter egg is output in response to detecting that current behavior data of the user conforms to the target trigger mode. This method can trigger easter eggs based on the preference feature of the user, achieve personalized triggering under different conditions, improve coverage and accuracy, enhance the fun of the terminal interaction process, enhance the interactivity between the user and the terminal, and improve the user experience.

Figure 2:
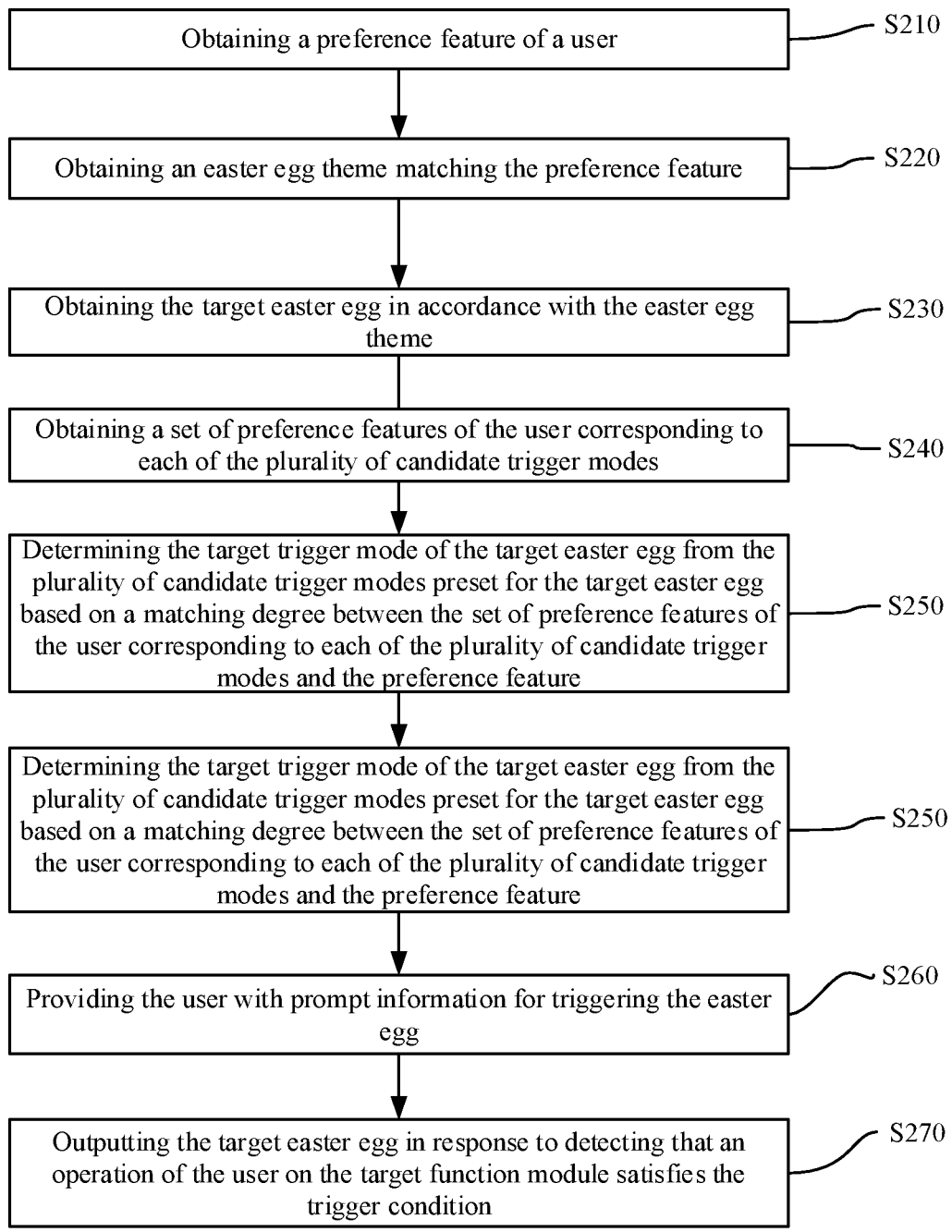
FIG. 2 is a flowchart of an easter egg presentation method according to a specific embodiment of the present disclosure.

FIG. 2 is a flowchart of an easter egg presentation method according to a specific embodiment of the present disclosure.

As shown in FIG. 2, the easter egg presentation method includes operations in the following blocks:

At block S210, a preference feature of a user is obtained.

At block S220, an easter egg theme matching the preference feature is obtained.

In an embodiment of the present disclosure, a corresponding easter egg label can be mapped from a mapping relationship between preference features of the user and easter egg labels, and the matching easter egg theme is obtained according to the obtained easter egg label and preference feature.

There may be many ways to determine the mapping relationship between the preference feature of the user and the easter egg label, for example, it may be manually specified, or a similarity algorithm, etc.

Two examples are given below for understanding:

As an example of a possible implementation method, manual designation is taken as an example. That is, the preference feature of the user is determined, a mapping relationship with the designated easter egg label is established, and the corresponding easter egg label is mapped from the mapping relationship between the preference feature of the user and the designated easter egg label. For example, the preference feature of the user is liking clothing, the designated easter egg labels include Beautiful Youth, Super Car, Novel Design, and Moisturizing, and the corresponding easter egg label mapped from the mapping relationship between the preference feature of the user and the easter egg label is Beautiful Youth.

As an example of another possible implementation, similarity algorithm is taken as an example. The preference feature of the user is determined, adjectives related to the "preference feature of the user" are obtained through the similarity algorithm, these adjectives are ranked, the easter egg label is determined according to the preference feature of the user and the adjectives related to the "preference feature of the user", and the mapping relationship between the preference feature of the user and the easter egg label is established according to the preference feature of the user and the easter egg label. For example, the preference feature of the user "funny video" is mapped to the easter egg label "funny category".

For example, the obtained preference feature of the user is liking cosmetics, and according to the preference feature of the user, the easter egg theme matching the preference feature can be obtained as cosmetics.

At block S230, the target easter egg is obtained in accordance with the easter egg theme.

In an embodiment of the present disclosure, the easter egg theme can be associated with an easter egg label to obtain a target easter egg.

For example, when the easter egg theme is April Fools' Day, it can be associated with the easter egg label "funny" to obtain the target easter egg of the funny category.

At block S240, a set of preference features of the user corresponding to each of the plurality of candidate trigger modes is obtained.

For example, the sets of preference features of the user corresponding to three candidate trigger modes, namely, search trigger mode, scan trigger mode, and comment trigger mode can be obtained. The set of preference features of the user corresponding to the search trigger mode includes: cosmetics, skin care products and clothing; the set of preference features of the user corresponding to the scan trigger mode includes: camera, notebook, sound box, and smart watch; and the set of preference features of the user corresponding to the comment trigger mode includes: "movie A" and "animation B".

At block S250, the target trigger mode of the target easter egg is determined from the plurality of candidate trigger modes preset for the target easter egg based on a matching degree between the set of preference features of the user corresponding to each of the plurality of candidate trigger modes and the preference feature.

For example, through matching of the obtained user preference feature of liking cosmetics with the sets of preference features of the user corresponding to the search trigger mode, the scan trigger mode, and the comment trigger mode obtained in block S240, it can be known that the trigger mode with a higher matching degree with the preference feature of the user of liking cosmetics is the search trigger mode, so that the target trigger mode of the target easter egg is determined as the search trigger mode.

At block S260, prompt information for triggering the easter egg is provided to the user.

The prompt information includes the target triggering mode and a recommended keyword.

In other words, after the target trigger mode of the target easter egg is determined, the trigger mode of triggering the easter egg and the recommended keyword can be provided to the user.

The recommended keyword is determined from a plurality of candidate keywords of the easter egg based on a keyword usage preference of the user.

In an embodiment of the present disclosure, based on the recommended keyword given by the easter egg, the present disclosure can calculate in advance how many users are covered. In order to cover more users, easter egg theme recommendation can be performed to cover more users. That is to say, in order to improve the coverage of the easter egg, according to the preference feature of the user and the recommended keyword of the easter egg, how many users the easter egg can cover and which users will trigger the easter egg can be calculated in advance, and the easter egg is recommended to the users in a recommended way.

In an embodiment of the present disclosure, the user can be informed by predicting what recommended keywords cover a large number of users. It should be noted that the predicting is based on the user's historical search volume. The recommendation is based on the prediction. For example, 10 recommended keywords are provided, and the recommended keywords are ranked, thereby recommending the theme to the user.

At block S270, the target easter egg is output in response to detecting that an operation of the user on the target function module satisfies the trigger condition.

In an embodiment of the present disclosure, that the operation of the user on the target function module satisfies the trigger condition includes: the operation of the target function module matches a trigger instruction.

That is to say, the target easter egg can be triggered, that is, the target easter egg can be output in response to detecting that the user performs a certain trigger mode on the target and the operation of the user on the target function module satisfies the trigger condition.

In an embodiment of the present disclosure, outputting the target easter egg includes: displaying at least one picture; or displaying a target text or target expression; or playing a target video or target music; or displaying a floating window on a current display interface of the terminal; and displaying the target easter egg in the floating window or displaying the target easter egg in the floating window by animation.

Said displaying the target easter egg in the floating window by animation includes: displaying at least one picture included in the target easter egg in the floating window by animation; or obtaining animation effects corresponding to each picture included in the target easter egg according to a correspondence relation between each picture included in the target easter egg and the animation effects; and displaying each picture included in the target easter egg in the floating window according to the animation effects corresponding to each picture included in the target easter egg.

In an embodiment of the present disclosure, when the extracted user preference feature cannot be mapped to an easter egg label, the easter egg will not be triggered even if the trigger condition is satisfied at this time. For example, when the extracted the preference feature of the user is liking commenting "funny", and the user behavior detected at this time is searching for "funny", it can be determined that the preference feature of the user cannot be mapped to the easter egg label, and the easter egg with the theme of "funny" may not be triggered at this time. As a result, the inconvenience to the user that a one-size-fits-all trigger mode is adopted when the user is not interested in an easter egg but accidentally triggers the easter egg is avoided, that is, the easter will not be triggered and will be avoided for users who have no intention of history.

According to the easter egg presentation method of the embodiment of the present disclosure, the preference feature of the user can be obtained, the easter egg theme matching the preference feature is obtained, the target easter egg is obtained in accordance with the easter egg theme, a set of preference features corresponding to each of the plurality of candidate trigger modes is obtained, the target trigger mode of the target easter egg is determined from the plurality of candidate trigger modes preset for the target easter egg in accordance with a matching degree between the set of preference features corresponding to each of the plurality of candidate trigger modes and the preference feature, prompt information for triggering the easter egg is provided to the user, and the target easter egg is output in response to detecting that the operation of the user on the target function module satisfies the trigger condition. This method can trigger the easter egg based on the preference feature of the user, achieve personalized triggering under different conditions, improve coverage and accuracy, enhance the fun of the terminal interaction process, enhance the interactivity between the user and the terminal, and improve the user experience.

Figure 3:
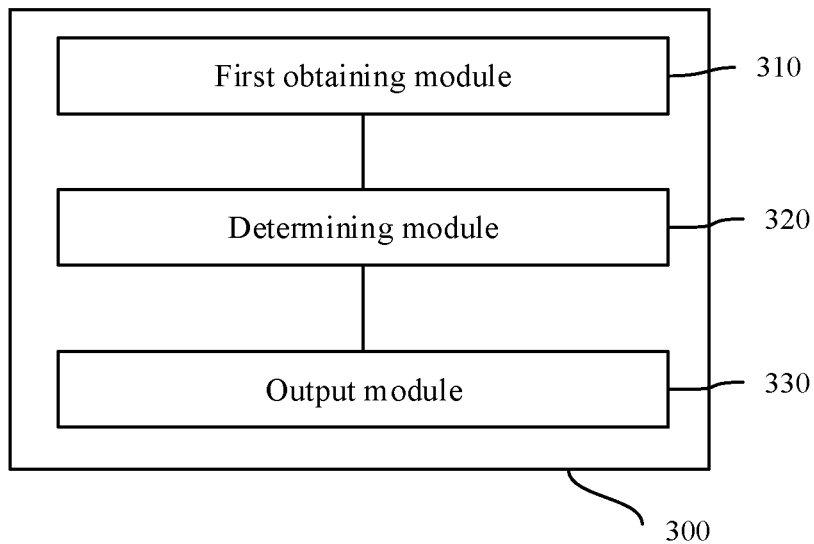
FIG. 3 is a structural schematic diagram of an easter egg presentation apparatus according to an embodiment of the present disclosure.

An embodiment of the present disclosure also provides an easter egg presentation apparatus corresponding to the easter egg presentation methods provided by the above several embodiments. Since the easter egg presentation apparatus provided by the embodiment of the present disclosure is corresponding to the easter egg presentation methods provided by the above several embodiments, the implementations of the easter egg presentation methods are also applicable to the easter egg presentation apparatus provided in this embodiment, and will not be described in detail in this embodiment. FIG. 3 is structural schematic diagram of an easter egg presentation apparatus according to an embodiment of the present disclosure.

As shown in FIG. 3, the easter egg presentation apparatus 300 includes: a first obtaining module 310, a determining module 320 and an output module 330.

The first obtaining module 310 is configured to obtain a preference feature of the user.

The determining module 320 is configured to determine, from a plurality of candidate trigger modes preset for a target easter egg, a target trigger mode matching the preference feature.

As an example, the determining module 320 is specifically configured to obtain a set of preference features of the user corresponding to each of the plurality of candidate trigger modes; and the target trigger mode of the target easter egg is determined from the plurality of candidate trigger modes preset for the target easter egg based on a matching degree between the set of preference features of the user corresponding to each of the plurality of candidate trigger modes and the preference feature.

As an example, the preference feature includes trigger mode usage preference information, and the determining module 320 is specifically configured to determine a target trigger mode matching the trigger mode usage preference information from the plurality of candidate trigger modes preset for the target easter egg.

The output module 330 is configured to output the target easter egg in response to detecting that current behavior data of the user conforms to the target trigger mode. As an example, the target trigger mode includes a target function module and a trigger condition, and the output module 330 is specifically configured to output the target easter egg in response to detecting that an operation of the user on the target function module satisfies the trigger condition.

Figure 4:
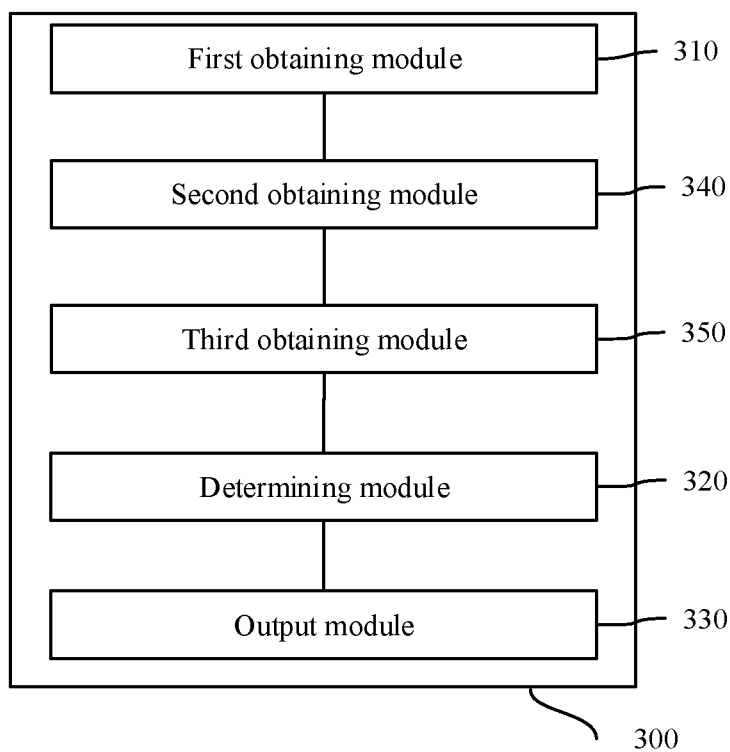
FIG. 4 is a structural schematic diagram of an easter egg presentation apparatus according to another embodiment of the present disclosure.

In an embodiment of the present disclosure, as shown in FIG. 4, the easter egg presentation apparatus further includes: a second obtaining module 340 and a third obtaining module 350. The second obtaining module 340 is configured to obtain an easter egg theme matching the preference feature; and the third obtaining module 350 is configured to obtain the target easter egg in accordance with the easter egg theme.

Figure 5:
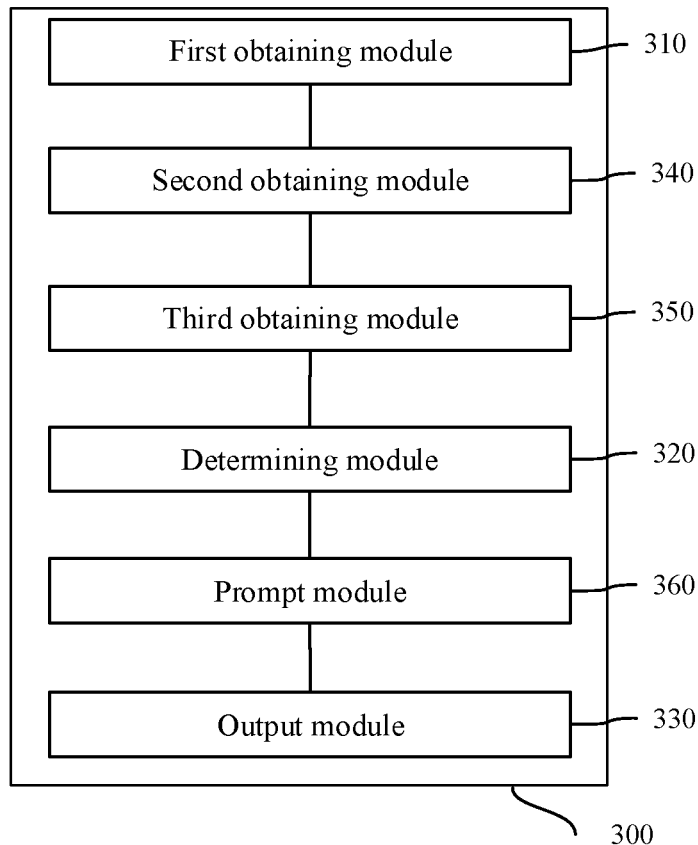
FIG. 5 is a structural schematic diagram of an easter egg presentation apparatus according to yet another embodiment of the present disclosure.

In an embodiment of the present disclosure, as shown in FIG. 5, the easter egg presentation apparatus further includes: a prompt module 360. The prompt module 360 is configured to provide the user with prompt information for triggering the easter egg, the prompt information includes the target trigger mode and a recommended keyword, the recommended keyword is determined from a plurality of candidate keywords of the easter egg based on a keyword usage preference of the user.

According to the easter egg presentation apparatus of the embodiment of the present disclosure, the preference feature of the user can be obtained by the first obtaining module, the target trigger mode matching the preference feature is determined by the determining module from a plurality of candidate trigger modes preset for the target easter egg, and the target easter egg is output by the output module in response to detecting that current behavior data of the user conforms to the target trigger mode. The apparatus can trigger the easter egg based on the preference feature of the user, achieve personalized triggering under different conditions, improve coverage and accuracy, enhance the fun of the terminal interaction process, enhance the interactivity between the user and the terminal, and improve the user experience.

Figure 6:
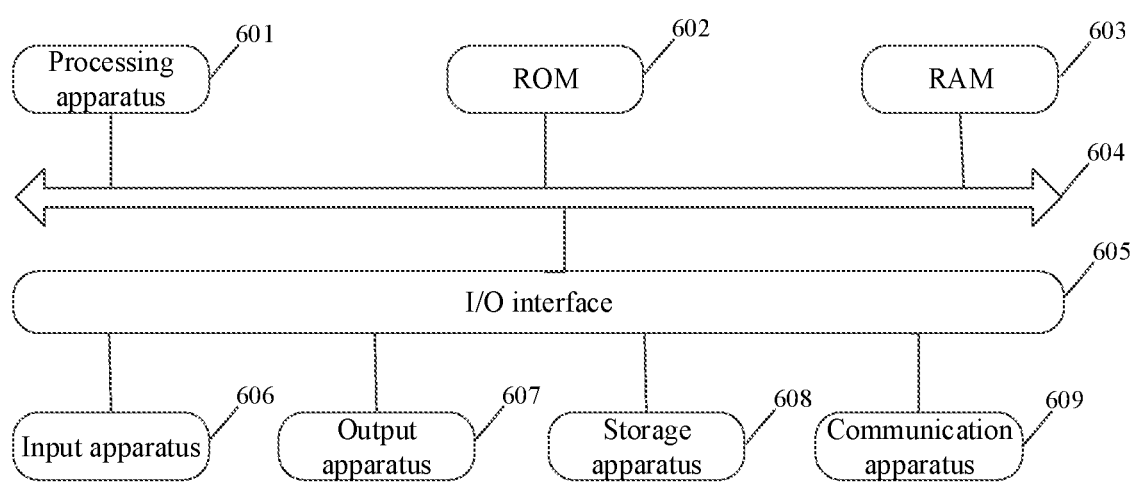
FIG. 6 is a structural schematic diagram of an electronic device according to an embodiment of the present disclosure.

Reference is now made to FIG. 6, which is a structural schematic diagram showing an electronic device 600 adapted to implement the embodiments of the present disclosure. The terminal device according to the embodiment of the present disclosure may include, but not limited to, mobile terminals such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 6 is exemplary only, and should not be construed as limiting the function and scope of use of the embodiments of the present disclosure.

As illustrated in FIG. 6, the electronic device 600 may include a processing apparatus (such as a central processing unit, a graphics processing unit, etc.) 601, which may perform various appropriate actions and processes in accordance with programs stored in a read only memory (ROM) 602 or loaded from a storage apparatus 608 into a random access memory (RAM) 603. In the RAM 603, various programs and data required for operation of the electronic device 600 may also be stored. The processing apparatus 601, the ROM 602, and the RAM 603 are connected to each other through a bus 604. An Input/Output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a Liquid Crystal Display (LCD), a speaker, an oscillator, etc.; the storage apparatus 608 including, for example, a magnetic tape or a hard disk; and a communication apparatus 609. The communication apparatus 609 may allow the electronic device 600 to perform wireless or wired communication with other devices for data exchange. Although FIG. 6 illustrates the electronic device 600 having various apparatuses, it can be appreciated that it is not necessary to implement or provide all the illustrated apparatuses. Alternatively, more or fewer apparatuses may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication apparatus 609, or installed from the storage apparatus 608, or installed from the ROM 602. When the computer program is executed by the processing apparatus 601, the above functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium carries one or more programs which, when executed by the electronic device, cause the electronic device to: obtain the preference feature of the user; determine, from a plurality of candidate trigger modes preset for a target easter egg, a target trigger mode matching the preference feature; and output the target easter egg in response to detecting that current behavior data of the user conforms to the target trigger mode.

Alternatively, the above computer-readable medium carries one or more programs which, when executed by the electronic device, cause the electronic device to: obtain the preference feature of the user; determine, from a plurality of candidate trigger modes preset for a target easter egg, a target trigger mode matching the preference feature; and output the target easter egg in response to detecting that current behavior data of the user conforms to the target trigger mode.

The computer program codes for implementing the operations according to the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flow chart and the block diagram in the drawings illustrate the architecture, functionality, and operation of possible implementations of the systems, methods, and computer program products according to various embodiments of the present disclosure. In this regard, each block in the flow chart or the block diagram may represent a module, program segment, or portion of code, which includes one or more executable instructions for implementing the specified logical function or functions. It should also be noted that, in some alternative implementations, the functions noted in the blocks may occur out of the order noted in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or the flow chart, can be implemented by a dedicated hardware-based system that performs the specified functions or operations, or can be implemented by a combination of dedicated hardware and computer instructions.

The units involved in the embodiments described in the present disclosure can be implemented in software or hardware. The name of the unit does not constitute a limitation on the unit itself under certain circumstances. For example, the first obtaining unit can also be described as "a unit for obtaining at least two Internet Protocol addresses".

What is claimed is:

1. An easter egg presentation method, comprising:
obtaining a preference feature of a user;
determining, from a plurality of candidate trigger modes preset for a target easter egg, a target trigger mode matching the preference feature and disabling at least one other candidate trigger mode not matching the preference feature, wherein the plurality of candidate trigger modes correspond respectively to a plurality of sets of target function modules and trigger conditions, each target function module is configured for an electronic device to perform a different function; and
in the determined target trigger mode matching the preference feature, outputting the target easter egg in response to detecting that an operation of the user on the target function module corresponding to the determined target trigger mode matching the preference feature conforms to the trigger condition corresponding to the determined target trigger mode matching the preference feature, wherein
in the disabled candidate trigger mode not matching the preference feature, the target easter egg is not output even when detecting that an operation of the user on the target function module corresponding to the disabled candidate trigger mode conforms to the trigger condition corresponding to the disabled candidate trigger mode.

2. The method according to claim 1, wherein the target trigger mode comprises a target function module and a trigger condition; and
said outputting the target easter egg in response to detecting that the current behavior data of the user conforms to the target trigger mode comprises:
outputting the target easter egg in response to detecting that an operation of the user on the target function module satisfies the trigger condition.

3. The method according to claim 1, wherein said determining, from the plurality of candidate trigger modes preset for the target easter egg, the target trigger mode matching the preference feature comprises:
obtaining a set of preference features of the user corresponding to each of the plurality of candidate trigger modes; and
determining the target trigger mode of the target easter egg from the plurality of candidate trigger modes preset for the target easter egg based on a matching degree between the set of preference features of the user corresponding to each of the plurality of candidate trigger modes and the preference feature.

4. The method according to claim 1, wherein the preference feature comprises trigger mode usage preference information, and said determining, from the plurality of candidate trigger modes preset for the target easter egg, the target trigger mode matching the preference feature comprises:
determining, from the plurality of candidate trigger modes preset for the target easter egg, a target trigger mode matching the trigger mode usage preference information.

5. The method according to claim 1, further comprising, prior to said determining, from the plurality of candidate trigger modes preset for the target easter egg, the target trigger mode matching the preference feature:
obtaining an easter egg theme matching the preference feature; and
obtaining the target easter egg in accordance with the easter egg theme.

6. The method according to claim 1, further comprising, prior to said outputting the easter egg in response to detecting that the current behavior data of the user conforms to the target trigger mode:
providing the user with prompt information for triggering the easter egg, wherein the prompt information comprises the target trigger mode and a recommended keyword, wherein the recommended keyword is determined from a plurality of candidate keywords of the easter egg based on a keyword usage preference of the user.

7. An easter egg presentation apparatus, comprising:
a first obtaining module configured to obtain a preference feature of a user;
a determining module configured to determine, from a plurality of candidate trigger modes preset for a target easter egg, a target trigger mode matching the preference feature and disable at least one other candidate trigger mode not matching the preference feature, wherein the plurality of candidate trigger modes correspond respectively to a plurality of sets of target function modules and trigger conditions, each target function module is configured for an electronic device to perform a different function; and
an output module configured to output, in the determined target trigger mode matching the preference feature, the target easter egg in response to detecting that an operation of the user on the target function module corresponding to the determined target trigger mode matching the preference feature conforms to the trigger condition corresponding to the determined target trigger mode matching the preference feature, wherein
in the disabled candidate trigger mode not matching the preference feature, the target easter egg is not output even when detecting that an operation of the user on the target function module corresponding to the disabled candidate trigger mode conforms to the trigger condition corresponding to the disabled candidate trigger mode.

8. The apparatus according to claim 7, wherein the target trigger mode comprises a target function module and a trigger condition; and
the output module is further configured to:
output the target easter egg in response to detecting that an operation of the user on the target function module satisfies the trigger condition.

9. The apparatus according to claim 7, wherein the determining module is further configured to:
obtain a set of preference features of the user corresponding to each of the plurality of candidate trigger modes; and
determine the target trigger mode of the target easter egg from the plurality of candidate trigger modes preset for the target easter egg based on a matching degree between the set of preference features of the user corresponding to each of the plurality of candidate trigger modes and the preference feature.

10. The apparatus according to claim 7, wherein the preference feature comprises trigger mode usage preference information, and the determining module is further configured to:
determine, from the plurality of candidate trigger modes preset for the target easter egg, a target trigger mode matching the trigger mode usage preference information.

11. The presentation apparatus according to claim 7, further comprising:
a second obtaining module configured to obtain an easter egg theme matching the preference feature; and
a third obtaining module configured to obtain the target easter egg in accordance with the easter egg theme.

12. The presentation apparatus according to claim 7, further comprising:
a prompt module configured to provide the user with prompt information for triggering the easter egg, wherein the prompt information comprises the target trigger mode and a recommended keyword, wherein the recommended keyword is determined from a plurality of candidate keywords of the easter egg based on a keyword usage preference of the user.

13. An electronic device, comprising:
at least one processor; and
a memory communicatively connected to the at least one processor,
wherein the memory has instructions executable by the at least one processor stored thereon, the instructions being configured to implement the easter egg presentation method according to claim 1.

14. A non-transitory computer-readable storage medium having computer instructions stored thereon, wherein the computer instructions are configured to cause the computer to implement the easter egg presentation method according to claim 1.

15. The method according to claim 1, wherein
the plurality of candidate trigger modes comprise a search trigger mode and a comment trigger mode,
the target function module corresponding to the search trigger mode is a search function module, and the trigger condition corresponding to the search trigger mode is that a predetermined search keyword is input in a search input box,
the target function module corresponding to the comment trigger mode is a comment function module, and the trigger condition corresponding to the comment trigger mode is that a predetermined comment word is input in a comment section.

16. The apparatus according to claim 7, wherein
the plurality of candidate trigger modes comprise a search trigger mode and a comment trigger mode,
the target function module corresponding to the search trigger mode is a search function module, and the trigger condition corresponding to the search trigger mode is that a predetermined search keyword is input in a search input box,
the target function module corresponding to the comment trigger mode is a comment function module, and the trigger condition corresponding to the comment trigger mode is that a predetermined comment word is input in a comment section.

17. The electronic device according to claim 13, wherein
the plurality of candidate trigger modes comprise a search trigger mode and a comment trigger mode,
the target function module corresponding to the search trigger mode is a search function module, and the trigger condition corresponding to the search trigger mode is that a predetermined search keyword is input in a search input box,
the target function module corresponding to the comment trigger mode is a comment function module, and the trigger condition corresponding to the comment trigger mode is that a predetermined comment word is input in a comment section.

18. The non-transitory computer-readable storage medium according to claim 14, wherein
the plurality of candidate trigger modes comprise a search trigger mode and a comment trigger mode,
the target function module corresponding to the search trigger mode is a search function module, and the trigger condition corresponding to the search trigger mode is that a predetermined search keyword is input in a search input box, the target function module corresponding to the comment trigger mode is a comment function module, and the trigger condition corresponding to the comment trigger mode is that a predetermined comment word is input in a comment section.

\* \* \* \* \*